United States Patent [19]
Funawatari et al.

[11] Patent Number: 5,943,197
[45] Date of Patent: Aug. 24, 1999

[54] LID ASSEMBLY FOR DISK CARTRIDGE

[75] Inventors: Takatsugu Funawatari; Shuichi Kikuchi, both of Miyagi, Japan

[73] Assignee: Sony Corporation, Tokyo, Japan

[21] Appl. No.: 08/932,945

[22] Filed: Sep. 17, 1997

[30] Foreign Application Priority Data

Sep. 20, 1996 [JP] Japan .................................. 8-250657

[51] Int. Cl.⁶ .................................................. G11B 23/03
[52] U.S. Cl. ............................................................. 360/133
[58] Field of Search ..................................... 360/132–133

[56] References Cited

U.S. PATENT DOCUMENTS

| | | | |
|---|---|---|---|
| 4,740,856 | 4/1988 | Yoshii | 360/132 |
| 5,570,252 | 10/1996 | Summer | 360/133 |
| 5,805,379 | 9/1998 | Bordes | 360/133 |

*Primary Examiner*—A. J. Heinz
*Attorney, Agent, or Firm*—Frommer Lawerence & Huag, LLP; William S. Frommer

[57] ABSTRACT

A disk cartridge having a recording/reproducing opening arranged to be opened/closed with a small space and without a sliding operation, the disk cartridge having a magnetic disk, a cartridge body for rotatively accommodating the magnetic disk and a lid rotatively supported by the cartridge body. The cartridge body has a recording/reproducing opening through which a magnetic head unit is inserted. The attached lid is able to open/close the recording/reproducing opening in such a manner that the lid usually closes the recording/reproducing opening by an elastic member and opens the recording/reproducing opening by an opening unit of the recording/reproducing apparatus when an information signal is recorded/reproduced.

13 Claims, 16 Drawing Sheets

LID ASSEMBLY FOR DISK CARTRIDGE

BACKGROUND OF THE INVENTION

1. Field of the Invention

The present invention to a disk cartridge for rotatively accommodating a disc recording medium, such as a magnetic disk.

2. Description of Related Art

Hitherto, a hard disk has been used to record/reproduce a data signal, which must be processed by a computer, and an information signal of a program for operating the computer. The information signal is read/written to and from the hard disk by a magnetic head for scanning the hard disk.

The hard disk includes a removal disk in the category thereof which is structured to be detachable from a recording/reproducing portion of the computer. The removable hard disk enables the capacity of the information recording/reproducing unit of a computer to be enlarged.

To make the hard disk to be detachable and portable, the hard disk is accommodated in a disk cartridge. The disk cartridge includes a cartridge body having a disk accommodating portion in which the hard disk is rotatively accommodate, the cartridge body having a recording/reproducing opening formed to permit, for example, a magnetic head of the recording/reproducing unit to be inserted.

However, if foreign matter, such as dust, is introduced through the recording/reproducing opening in the disk cartridge, dust is allowed to adhere to the accommodated hard disk. Thus, there arises a problem in that information signals recorded on the hard disk deteriorates.

To overcome the above-mentioned problem, the disk cartridge has a shutter for opening/closing the recording/reproducing opening so that the disk cartridge is able to close the recording/reproducing opening when the hard disk is not used.

As a disk cartridge of a type having a shutter, a disk cartridge 201 of a type for rotatively accommodating a shutter 203, as shown in FIG. 1, has been known. The disk cartridge 201 is structured such that the shutter 203 is, as shown in FIG. 2, rotated into the cartridge body 202 in which the magnetic disk 205 is accommodated when the magnetic head is inserted into the cartridge body 202 which accommodates the magnetic disk 205. Thus, the recording/reproducing opening 204 is opened.

However, the disk cartridge 201 must have, in the cartridge body 202 thereof, a space for permitting the shutter 203 to be retracted.

That is, the disk cartridge 201 must have, in the cartridge body 202 thereof, the space in addition to the space for accommodating the magnetic disk 205. Therefore, the size of the disk cartridge 201 is enlarged excessively for use as a portable disk.

Another disk cartridge 211 has been disclosed which has a slidable shutter, as shown in FIG. 3, in order to reduce the size thereof.

The disk cartridge 211 has a guide groove formed at an end thereof opposite to the recording/reproducing opening 214 of the cartridge body 212 in the lengthwise direction, the guide groove being formed to permit the shutter 213 to slide. The shutter 213 is made of, for example, an elongated material or metal and formed into an elongated shape. The guide groove is formed adjacent to a magnetic disk 215 accommodated in a disk accommodating portion in order to reduce the size of the disk cartridge.

When the magnetic head is introduced into the disk cartridge 211, the shutter 213 is slid to the side surface of the cartridge body 212, as shown in FIG. 4.

However, the disk cartridge 211 having the structure including the slidable shutter 213 involves generation of dust because the shutter 213 slides and moves in the guide groove. Generated dust adheres to the magnetic disk 215, thus causing the reliability of information signals recorded on the magnetic disk 215 to be improved.

What is worse, the dust generated because of the sliding operation and allowed to adhere to the magnetic disk 215 damages the magnetic head for writing/reading an information signal to and from a signal recording surface of the magnetic disk 215.

SUMMARY OF THE INVENTION

Accordingly, an object of the present invention is to provide a disk cartridge which is capable of improving the reliability of an operation for recording/reproducing an information signal and which is able to reduce the size thereof.

According to one aspect of the present invention, there is provided a disk cartridge including: a disk cartridge body for rotatively accommodating a disc-shape recording medium and having a recording/reproducing opening on a side surface thereof to permit insertion of means for recording/reproducing an information signal; a lid having a main surface for closing the recording/reproducing opening formed in the cartridge body and support portions formed at the two ends of the main surface and provided for the recording/reproducing opening in such a manner that the lid can be opened/closed; and a support shaft for rotatively supporting the support portions of the lid.

Since the lid of the thus-structured disk cartridge is rotated in such a manner that the support shafts serve as the support points for the rotation when recording/reproducing means is inserted into the recording/reproducing opening, the recording/reproducing opening can be opened.

That is, the disk cartridge has the structure such that the lid is rotated with respect to the cartridge body through the support portions when the recording/reproducing opening of the cartridge body is opened.

Other and further objects, features and advantage of the invention will be appear more fully from the following description.

DETAILED DESCRIPTION OF PREFERRED EMBODIMENTS

An embodiment of a disk cartridge according to the present invention will now be described with reference to the drawings.

Figure 1:
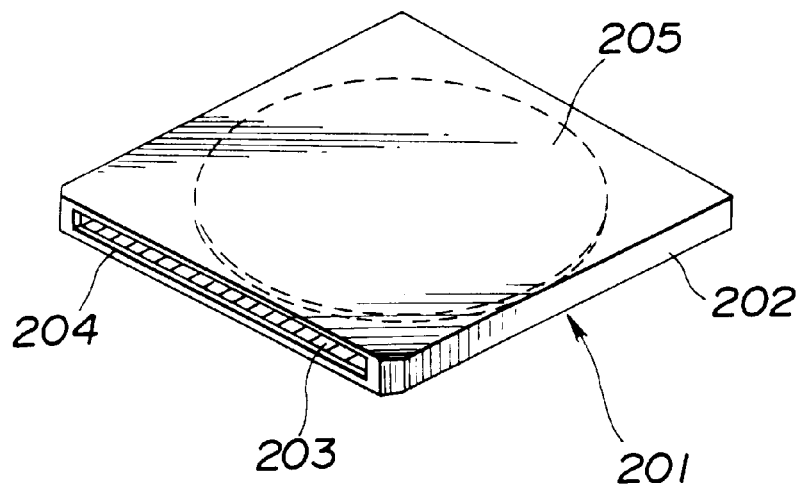
FIG. 1 is a perspective view showing a conventional shutter-rotative-type disk cartridge.
Figure 2:
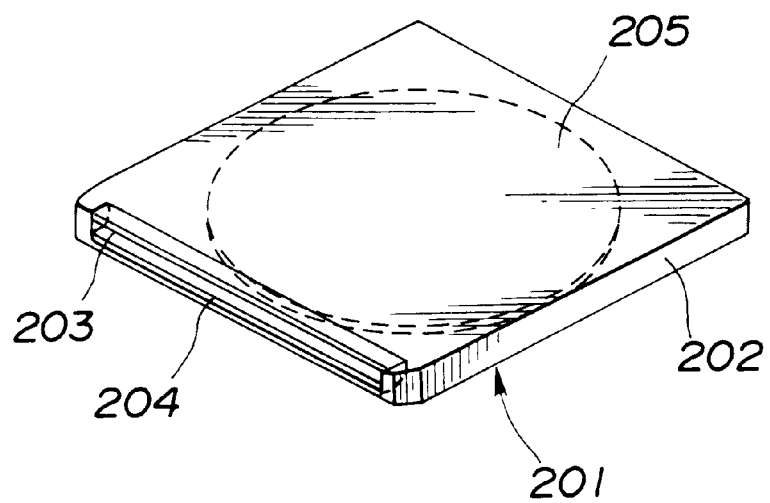
FIG. 2 is a perspective view showing another conventional shutter-rotative-type disk cartridge.
Figure 3:
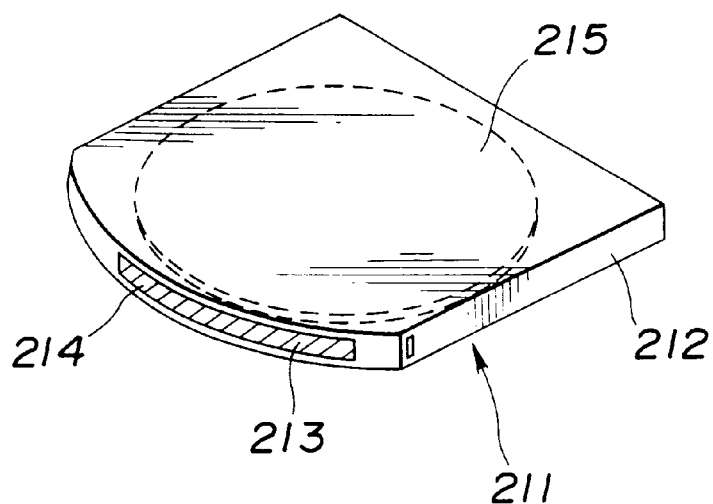
FIG. 3 is a perspective view showing a conventional shutter-slidable-type disk cartridge.
Figure 4:
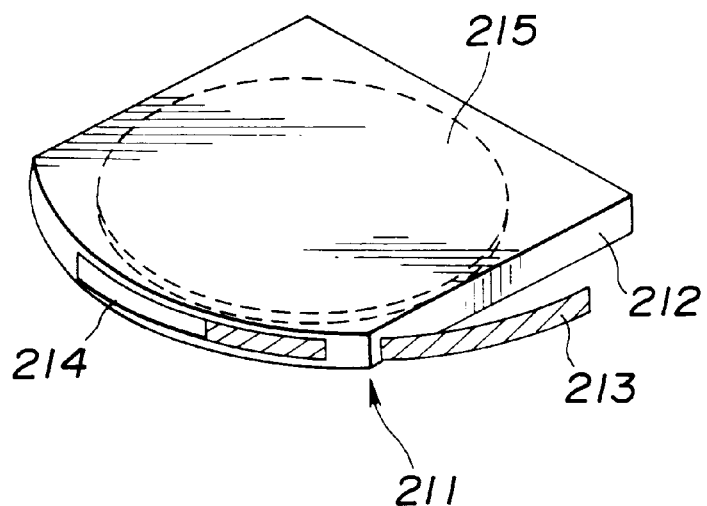
FIG. 4 is a perspective view showing another conventional shutter-slidable-type disk cartridge.
Figure 5:
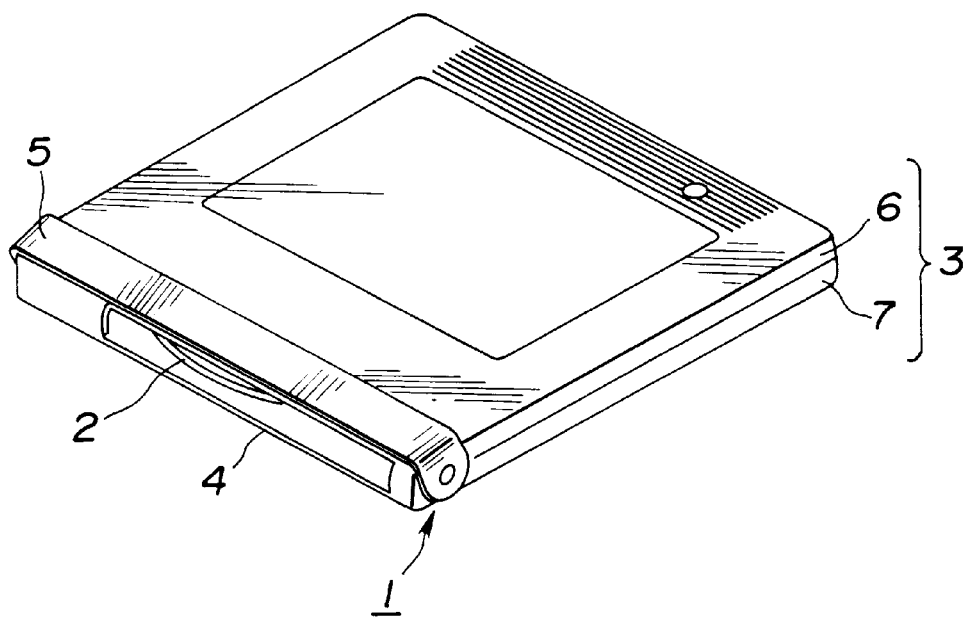
FIG. 5 is a perspective view showing a disk cartridge according to an embodiment of the present invention.
Figure 6:
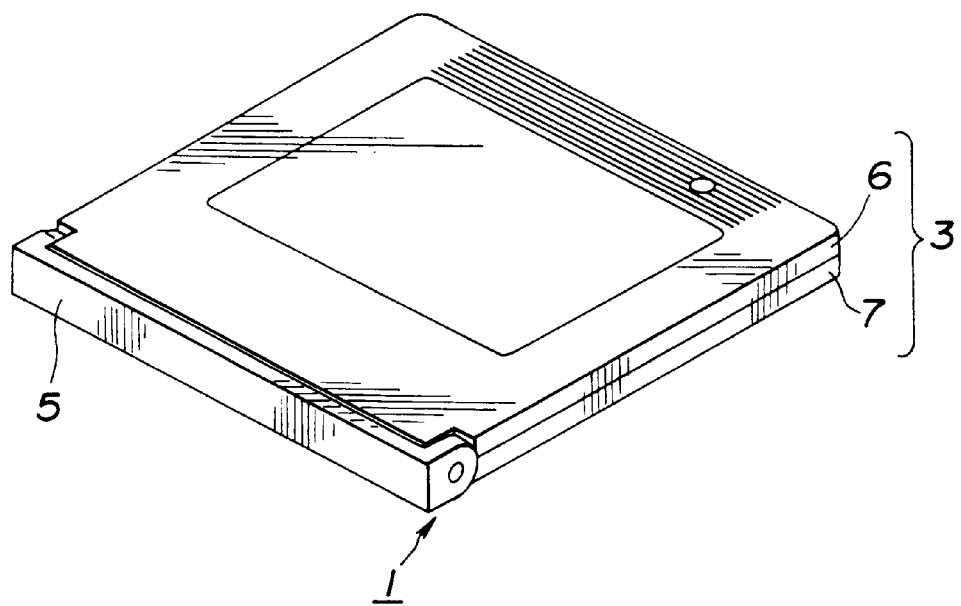
FIG. 6 is a perspective view showing the disk cartridge.
Figure 7:
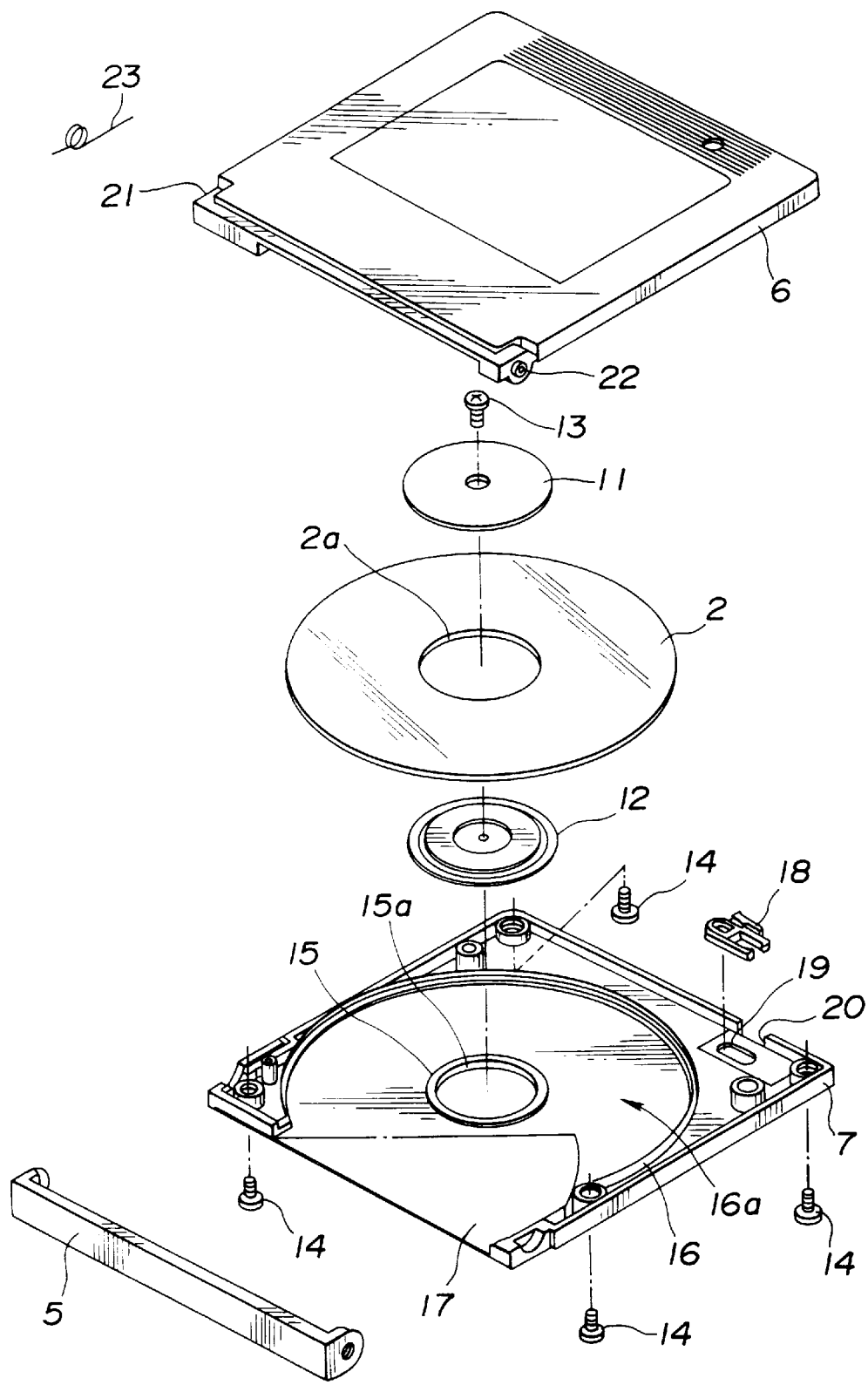
FIG. 7 is an exploded perspective view showing the disk cartridge.

As shown in FIGS. 5 to 7, the disk cartridge 1 includes a cartridge body 3, a lid 5 attached to the cartridge body 3 and a magnetic disk 2 which is accommodated in the cartridge body 3.

The lid 5 is rotatively supported by the cartridge body 3 to be capable of opening/closing a recording/reproducing opening 4 formed in the cartridge body 3.

The magnetic disk 2 is made of metal formed into a thin disc shape having a surface coated with a magnetic layer serving as a signal recording layer, the magnetic disk 2 having a center hole 2a in the central portion thereof. In the central portion of the magnetic disk 2 having the center hole 2a, an upper hub 11 and a lower hub 12 are attached across the magnetic disk 2. The upper hub 11 and the lower hub 12 are connected to each other by bolts 13. The upper hub 11 is made of synthetic resin, while the lower hub 12 is formed by a metal plate having a magnetic attraction characteristic.

The cartridge body 3 is formed by joining together an upper half portion 6 formed by a substantially rectangular plate member made of synthetic resin and having a peripheral wall stood erect and a lower half portion 7. The upper half portion 6 and the lower half portion 7 are secured to each other by several bolts 14. The cartridge body 3 formed by joining and securing the upper half portion 6 and the lower half portion 7 accommodates the magnetic disk 2.

The recording/reproducing opening 4 is formed in one of side surfaces of the cartridge body 3 to introduce a magnetic head unit for recording/reproducing an information signal to and from the magnetic disk 2. The recording/reproducing opening 4 has a length not less than ⅔ of the length of one side of the cartridge body 3.

The lower half portion 7 has a disk accommodating wall 16 in the form of a substantially circular-arc shape to be adaptable to the outer surface of the magnetic disk 2. Similarly to the lower half portion 7, the upper half portion 6 has a disk accommodating wall (not shown) in the form of a substantially circular-arc shape to be adaptable to the outer surface of the magnetic disk 2. When the upper half portion 6 and the lower half portion 7 are joined up, the magnetic disk 2 can therefore be accommodated in a disk accommodating portion 16a.

As shown in FIG. 7, the lower half portion 7 has an annular support wall 15 for rotatively supporting the lower hub 12. Moreover, the lower half portion 7 has an opening 15a through which a member of a rotating section of the recording/reproducing unit is introduced. Similarly to the lower half portion 7, the upper half portion 6 has an annular support wall on the inner surface thereof opposite to the support wall 15 in order to rotatively supporting the upper hub 11. As a result, the lower hub 12 is engaged to the member of the rotating section so that the magnetic disk 2 is rotated.

Moreover, the lower half portion 7 has a head introducing step 17 formed from a position adjacent to the outer surface of the support wall 15 to an end of the recording/reproducing opening 4 in order to prevent contact of the magnetic head unit which is inserted through the recording/reproducing opening 4. The head introducing step 17 has, for example, a sector shape as shown in FIG. 7, to correspond to the passage through which the magnetic head unit is introduced. Similarly to the lower half portion 7, the upper half portion 6 has a head introducing step (not shown) to correspond to the passage through which the magnetic head is introduced.

Figure 8:
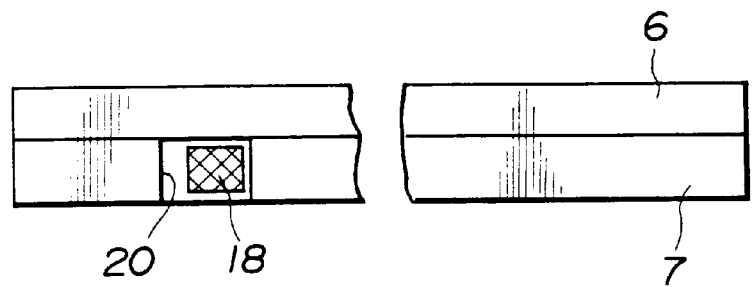
FIG. 8 is a side view showing an essential portion of the disk cartridge.

The upper half portion 6 and the lower half portion 7 have plug support walls 19 for slidably supporting an erroneous deletion preventive plug 18 for preventing erroneous deletion of an information signal recorded on the magnetic disk 2. As shown in FIG. 8, the lower half portion 7 has an operation window 20 for permitting, for example, a user to operate the erroneous deletion preventive plug 18.

Figure 9:
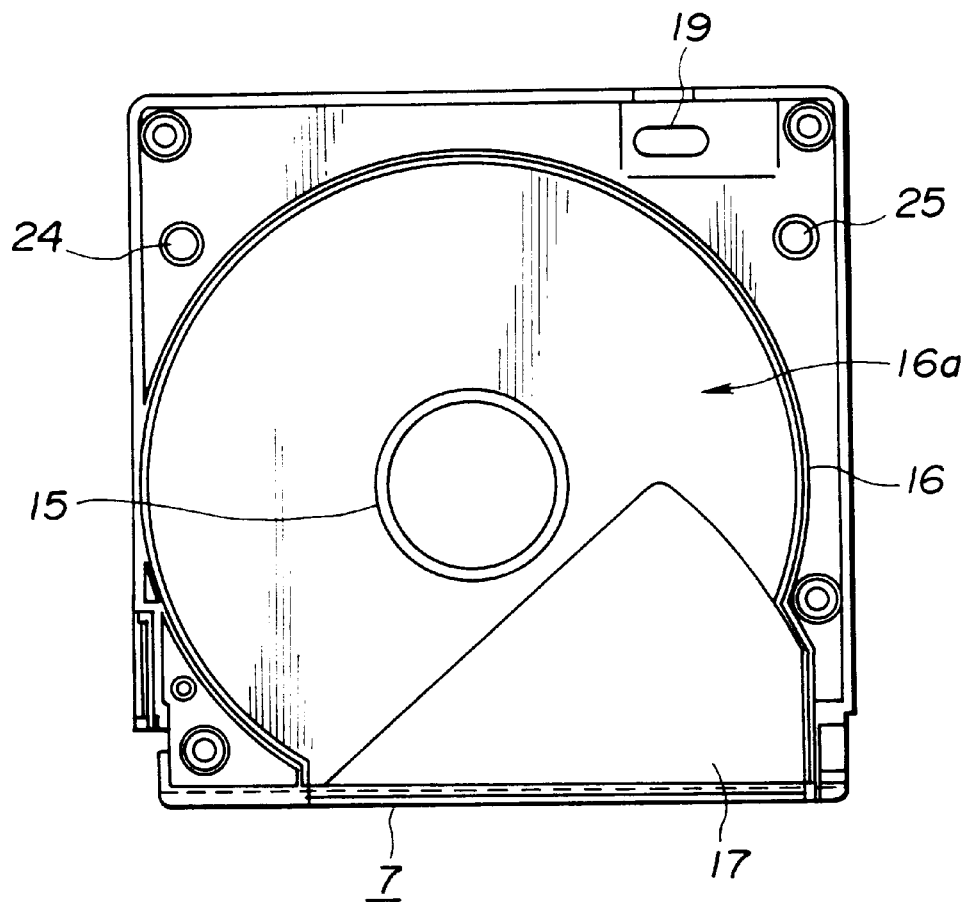
FIG. 9 is a plan view showing the shape of a lower half portion.

Moreover, the lower half portion 7 has a first circular locating hole 24 and a second elliptic locating hole 25, as shown in FIG. 9. The first locating hole 24 and the second elliptic locating hole 25 locate the disk cartridge 1 loaded into the recording/reproducing unit at a predetermined position.

On the other hand, a first circular engagement groove 21 and a second engagement groove 22 for rotatively supporting the lid 5 are formed at two ends of the vertical and peripheral wall of the upper half portion 6, as shown in FIG. 7.

Figure 10:
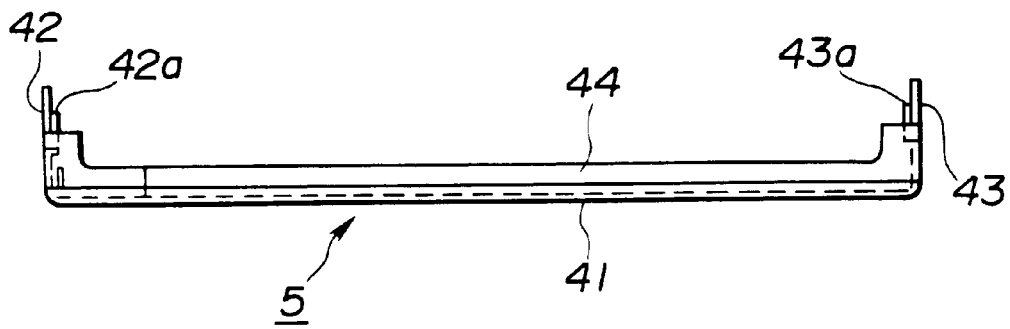
FIG. 10 is a plan view showing the shape of a lid.
Figure 11:
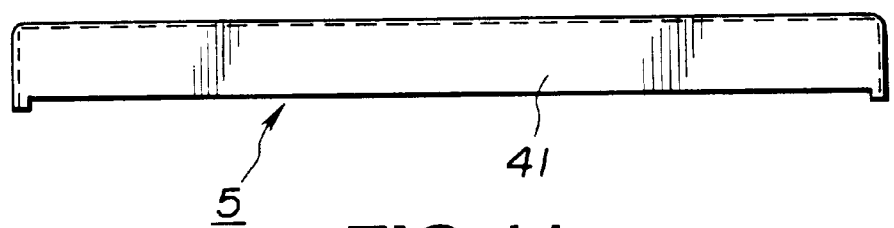
FIG. 11 is a plan view showing the shape of the lid.
Figure 12:
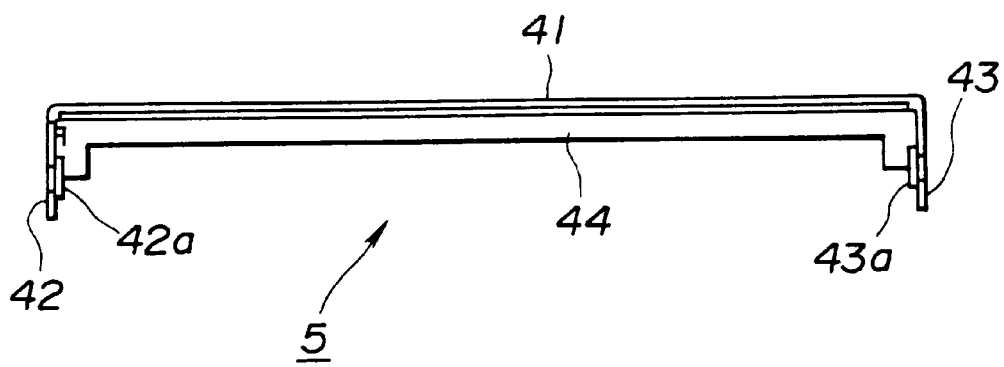
FIG. 12 is a bottom view showing the shape of the lid.

As shown in FIGS. 10 to 12, the lid 5 has a plate-like main surface 41 for closing the recording/reproducing opening 4 formed in one side of the cartridge body 3, first support portion 42 and second support portion 43 formed at the two lengthwise directional ends of the main surface 41 so that the overall shape including the main surface 41 is formed into a U-shape. Moreover, the lid 5 has an upper plate portion 44 formed on an end surface of the main surface 41 in the shorter side thereof, the upper plate portion 44 being integrally formed with the main surface 41 to run parallel to the lengthwise direction of the main surface 41. Note that the first support portion 42 and the second support portion 43 project over the end surface of the shorter side of the upper plate portion 44.

The first support portion 42 has a first support hole 42a formed into a circular shape. The second support portion 43 has a second support hole 43a also formed into a circular shape. The centers of the first support hole 42a and second support hole 43a coincide with each other.

Figure 13:
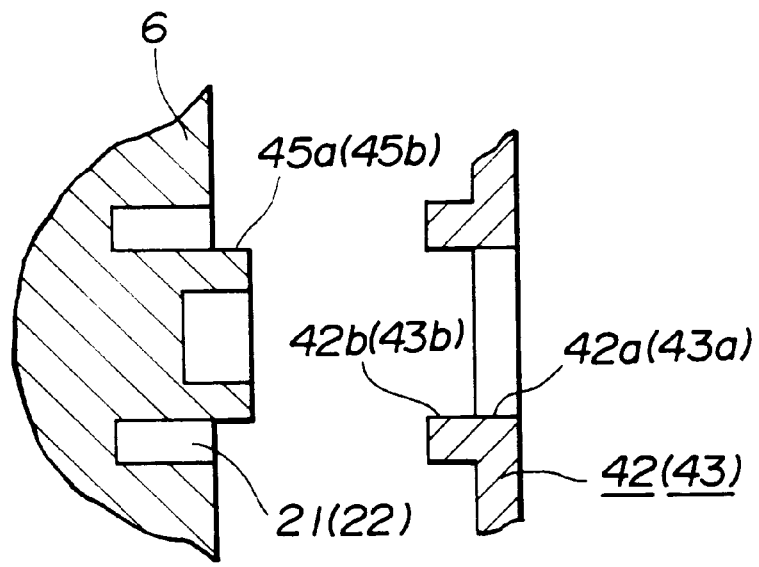
FIG. 13 is a cross sectional view showing the shapes of an upper half portion and a rotative support portion for the lid.

As shown in FIG. 13, the first support hole 42a has a first projection 42b having an outer portion projecting over the thickness of the first support portion 42 and arranged to be engaged to the first engagement groove 21. Similarly, the second support hole 43a has a second projection 43b having an outer portion projecting over the thickness of the second support portion 43 and arranged to be engaged to the second engagement groove 22.

The first engagement groove 21 and second engagement groove 22 respectively have a first support shaft 45a and a second support shaft 45b in the form of support rods stood erect in substantially the central portions thereof.

Thus, the first engagement groove 21 and the outer surface of the first projection 42b are engaged to each other, the first support shaft 45a and the first support hole 42a are engaged to each other, the second engagement groove 22 and the outer surface of the second projection 43b are engaged to each other, and the second support shaft 45b and the second support hole 43a are engaged to each other. Thus, the lid 5 is rotatively supported by the upper half portion 6.

Figure 14:
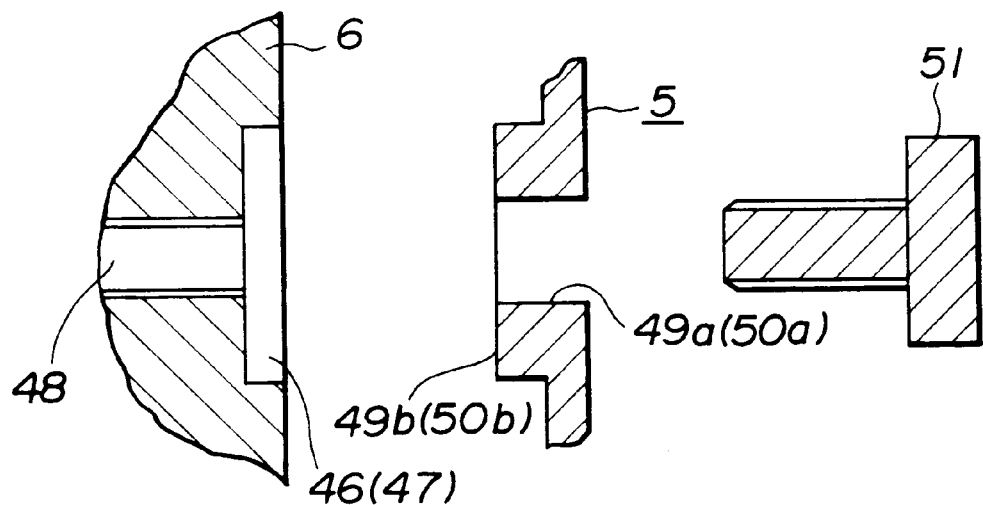
FIG. 14 is a cross sectional view showing other shapes of the upper half portion and the rotative support portion for the lid.

In place of the first and second support shafts 45a and 45b provided for the first and second engagement grooves 21 and 22, the upper half portion 6 may be provided with first and second engagement groove 46 and 47, as shown in FIG. 14. Moreover, a thread groove portion 48 may be formed in substantially the central portion of each of the first and second engagement groove 46 and 47.

In the foregoing case, the projections 49b and 50b provided for the lid 5 and the first and second engagement groove 46 and 47 are engaged to one another. Moreover, lid fixing screws 51 serving as support shafts are inserted into support holes 49a and 50a, and then screwed up. Thus, the lid 5 can rotatively be supported by the upper half portion 6.

Figure 15:
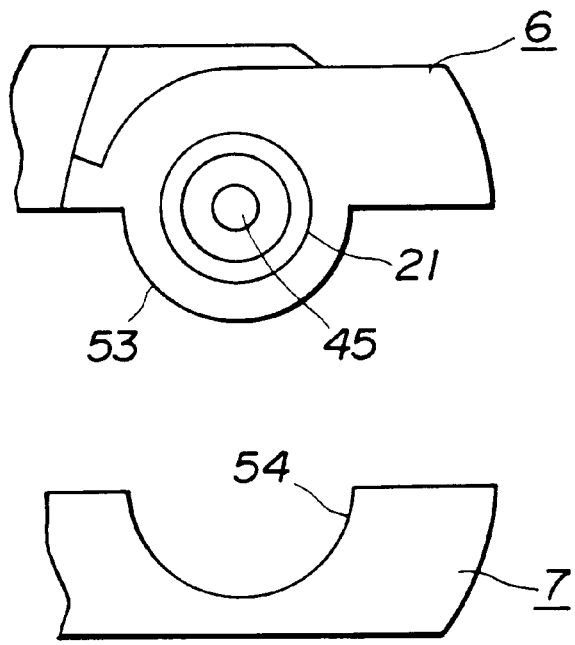
FIG. 15 is a side view showing the shapes of the upper half portion and the lower half portion adjacent to the rotative support portion.

Note that the upper half portion 6, as shown in FIG. 15, has a first projection 53 in the form of a circular-arc shape on the outside of the first engagement groove 21. The lower half portion 7 has a first recess 54 arranged to be engaged to the first projection 53 when the upper half portion 6 and the lower half portion 7 are coupled to each other. Similarly, a circular-arc-shape projection is formed on the outside of the second engagement groove 22. Moreover, the lower half portion 7 has a recess arranged to be engaged to the above-mentioned projection when the upper half portion 6 and the lower half portion 7 are coupled to each other.

Figure 16:
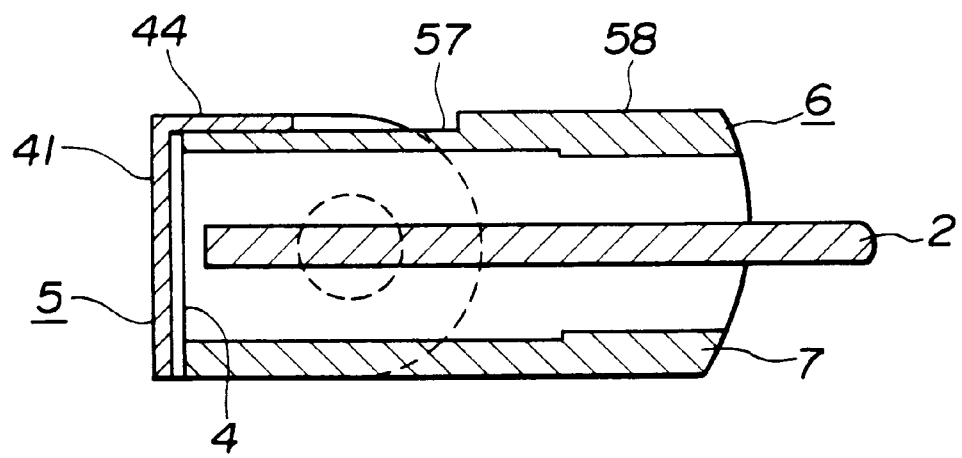
FIG. 16 is a cross sectional view showing the shapes of the upper half portion and the lower half portion arranged to be engaged to the lid having a plate-like main surface.

The lid 5 is, as shown in FIG. 16, rotatively supported by the upper half portion 6 so as to close the recording/reproducing opening 4.

As described above, the lid 5 is in the form in which the plate-like main surface 41 and the plate-like upper plate portion 44 are integrally formed with each other so that an L-shape cross section is formed. The ends of the upper half portion 6 and the lower half portion 7 are formed to be engaged to the inner surface of the main surface 41 when the lid 5 has closed the recording/reproducing opening 4. The upper plate portion 44 of the lid 5 has an inner surface arranged to be engaged to an upper step section 57 of the upper half portion 6. The upper step section 57 of the upper half portion 6 is formed to be stepped from an outside surface 58 of the upper half portion 6 in such a manner that the outer surface of the upper plate portion 44 and the outside surface 58 of the upper half portion 6 form substantially the same surface.

Figure 17:
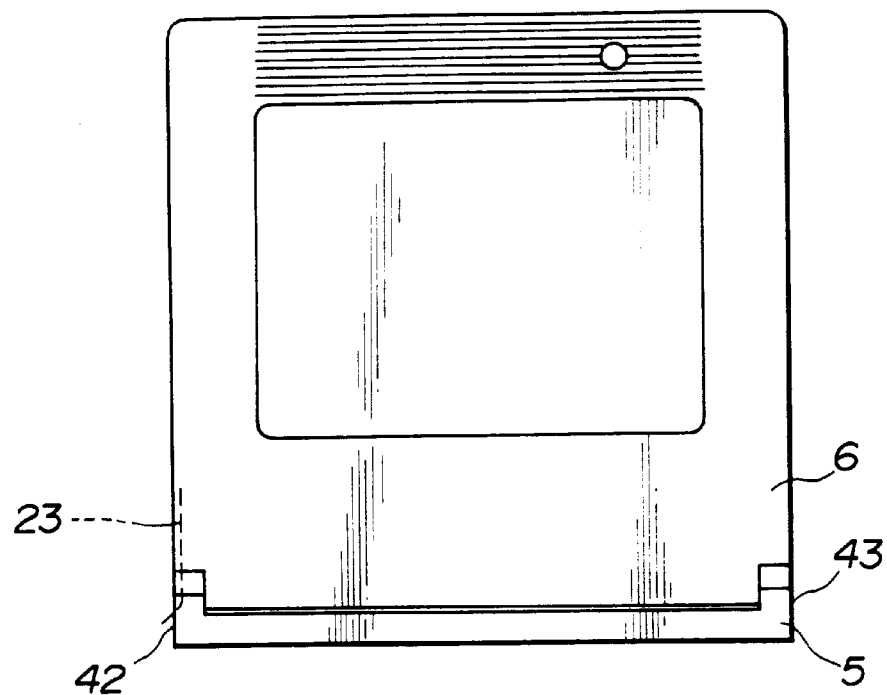
FIG. 17 is a plan view showing the disk cartridge.
Figure 18:
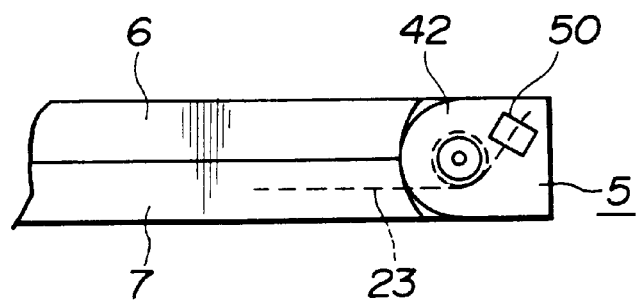
FIG. 18 is a side view showing a state of a torsion spring provided for the disk cartridge and arranged to urge the lid having the plate-like main surface.
Figure 19:
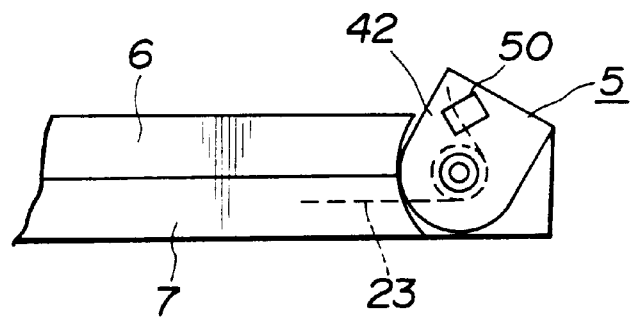
FIG. 19 is a side view showing another state of the torsion spring provided for the disk cartridge and arranged to urge the lid having the plate-like main surface.

As shown in FIG. 17, a torsion spring 23 is disposed adjacent to the inside portion of the first support portion 42 of the lid 5. As shown in FIG. 18, a spring stopping hole 50 is formed in the first support portion 42. An end of the torsion spring 23 is inserted into the spring stopping hole 50 so as to be attached. When spring force in the direction of clockwise rotation when viewed in FIGS. 18 and 19 is applied, the lid 5 is able to usually close the recording/reproducing opening 4 due to the spring force of the torsion spring 23.

As described above, the lid 5 which is urged to usually close the recording/reproducing opening 4 prevents introduction of foreign matter, such as dust, into the cartridge body 3 when the hard disk is not used.

Since the disk cartridge 1 rotatively supporting the lid 5 moves the same to close the recording/reproducing opening 4, the sliding portion can be reduced. Since the disk cartridge 1 has the support portion at an end of one of the side surfaces of the cartridge body 3 having the recording/reproducing opening 4, introduction of dust into the cartridge body 3 caused from the sliding operation can be prevented even if dust is generated in, for example, the support portion.

Therefore, the disk cartridge 1 is able to prevent foreign matter, such as dust, into the cartridge body 3 thereof. Thus, adhesion of dust or the like to the signal side of the magnetic disk 2 can be prevented. As a result, the disk cartridge 1 improves the reliability of the signal recording medium.

Figure 20:
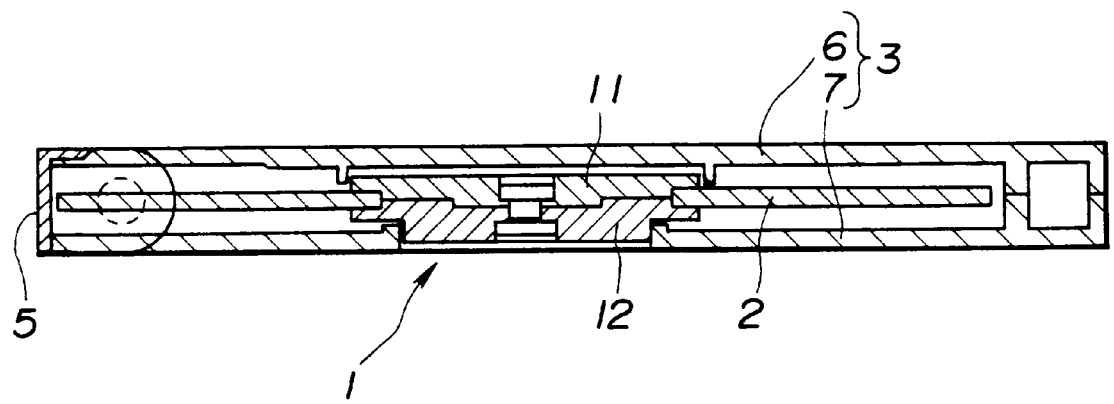
FIG. 20 is a vertical cross sectional view showing the disk cartridge.
Figure 21:
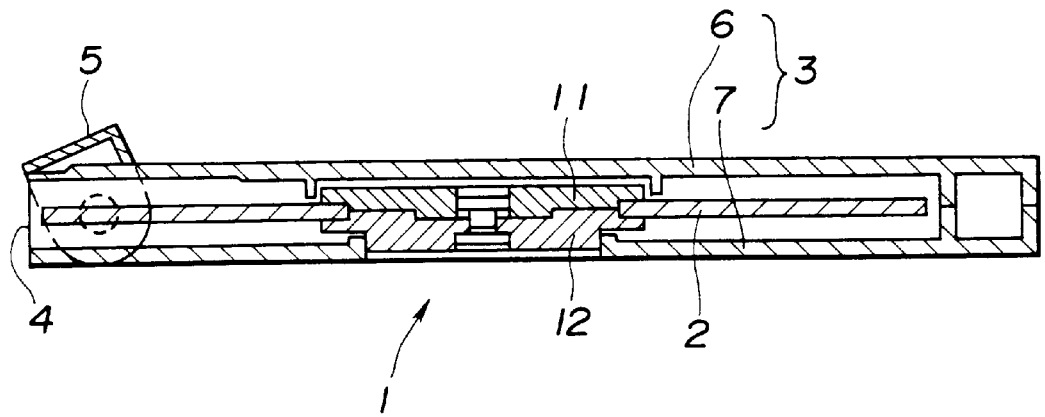
FIG. 21 is a vertical cross sectional view showing another disk cartridge.

The magnetic disk 2 rotatively supported by the cartridge body 3 through the upper hub 11 and the lower hub 12 is, as shown in FIGS. 20 and 21, accommodated in such a manner that the magnetic disk 2 is not in contact with the inner surface of the cartridge body 3. Therefore, the magnetic disk 2 does not come in contact with the upper and lower half portions 6 and 7 and thus the magnetic disk 2 is not damaged when the hard disk is vibrated during transportation of the hard disk.

Moreover, the disk cartridge 1 having opening/closing means is able to retract the lid 5 to the position adjacent to the outer surface of the upper half portion 6 as shown in FIG. 21 after the disk cartridge 1 has been loaded into the recording/reproducing unit.

Figure 22:
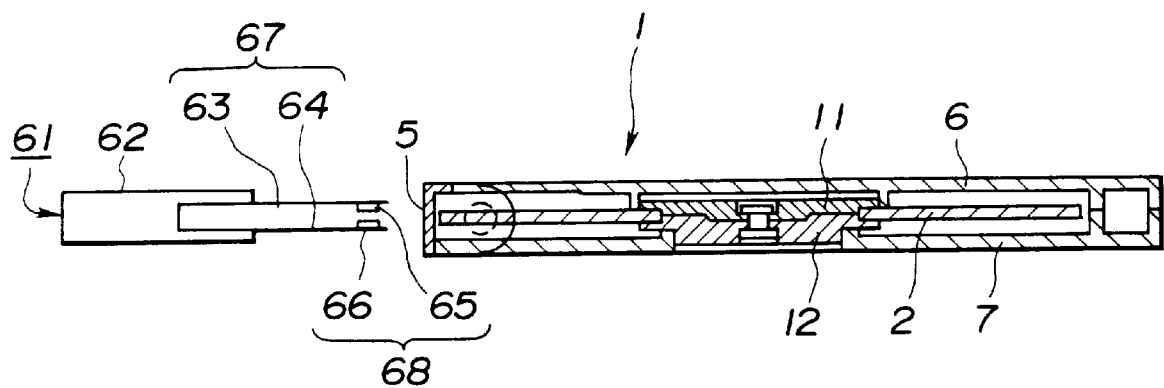
FIG. 22 is a vertical cross sectional view showing a state before a magnetic head unit is inserted into the disk cartridge.

When an information signal is recorded on the magnetic disk 2 or reproduced from the same, a magnetic head unit 61 is inserted through one side surface of the disk cartridge 1 having the lid 5, as shown in FIG. 22.

The magnetic head unit 61 includes an arm 62 which is rotatively supported, a magnetic head portion 68 for writing an information signal onto a signal recording surface of the magnetic disk 2 or reading an information signal from the same and a magnetic-head support portion 67 for supporting the magnetic head portion 68.

The magnetic-head support portion 67 includes a first suspension 63 having a first magnetic head 65 at the leading end thereof and a second suspension 64 having a second magnetic head 66 at the leading end thereof.

Figure 23:
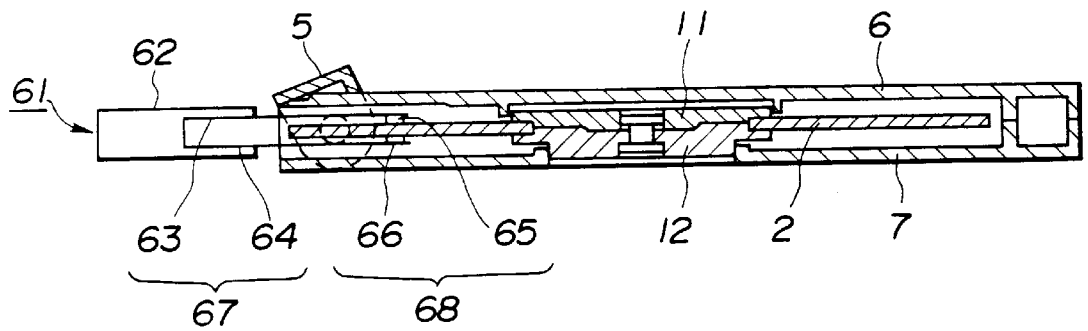
FIG. 23 is a vertical cross sectional view showing a state after the magnetic head unit has been inserted into the disk cartridge.

When an information signal is recorded or read, the lid 5 is retracted to the position adjacent to the outer surface of the upper half portion 6. Then, the magnetic head portion 68 is set to the signal recording surface of the magnetic disk 2 as shown in FIG. 23 so that an information signal is written on the signal recording surface or read from the same.

As described above, the lid 5 of the disk cartridge 1 is usually closes the recording/reproducing opening 4 and the lid 5 opens the recording/reproducing opening 4 when a recording operation or a reproducing operation is performed. Therefore, introduction of dust or the like into the cartridge body 3 can be prevented.

Therefore, the disk cartridge 1 is able to prevent introduction of foreign matter, such as dust, which adheres to the surface of the magnetic disk 2, and which causes a signal recording/reproducing device, such as a magnetic head, to be broken. Thus, the disk cartridge 1 is able to protect the signal recording/reproducing device from being broken. As a result, the reliability of an information signal, which is written on the magnetic disk 2 or read from the same, can be improved.

Figure 24:
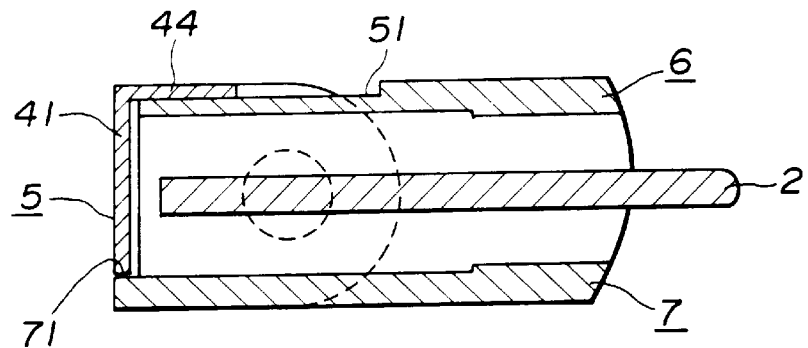
FIG. 24 is a cross sectional view showing the upper half portion and the lower half portion having a contact portion arranged to be engaged to the lid having the plate-like main surface.

The lower half portion 7 may have a lid contact portion 71 which projects over the surface of the upper half portion 6, as shown in FIG. 24.

In the foregoing case, the lid 5 is formed in such a manner that the upper plate portion 44, arranged to be engaged to the lid fixing screws 51 when the lid 5 has closed the recording/reproducing opening 4, and the main surface 41 arranged to be in contact with the lid contact portion 71 are integrally formed.

Figure 25:
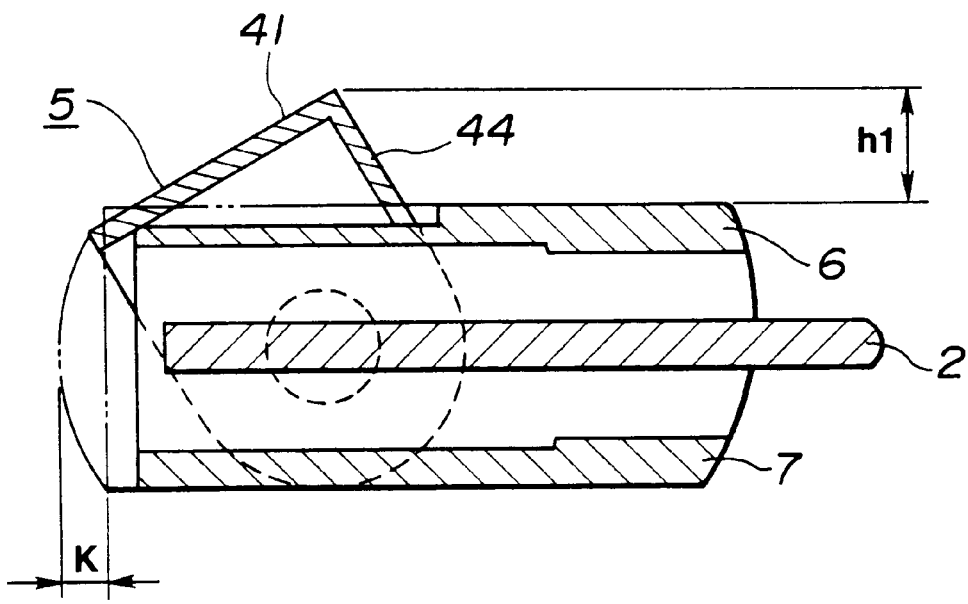
FIG. 25 is a vertical cross sectional view showing the shapes of the upper half portion and the lower half portion arranged to be engaged to the lid having the plate-like main surface.

When the lid 5 has been retracted to a position adjacent to the outer surface of the upper half portion 6, dead space h1, which is the distance from the main surface 41 to the apex of the corner of the upper plate portion 44, is formed in the disk cartridge 1, as shown in FIG. 25. Moreover, dead space k projecting over the main surface 41 in the closed state is formed because of the locus of movement of an end of the main surface 41 of the lid 5.

Figure 26:
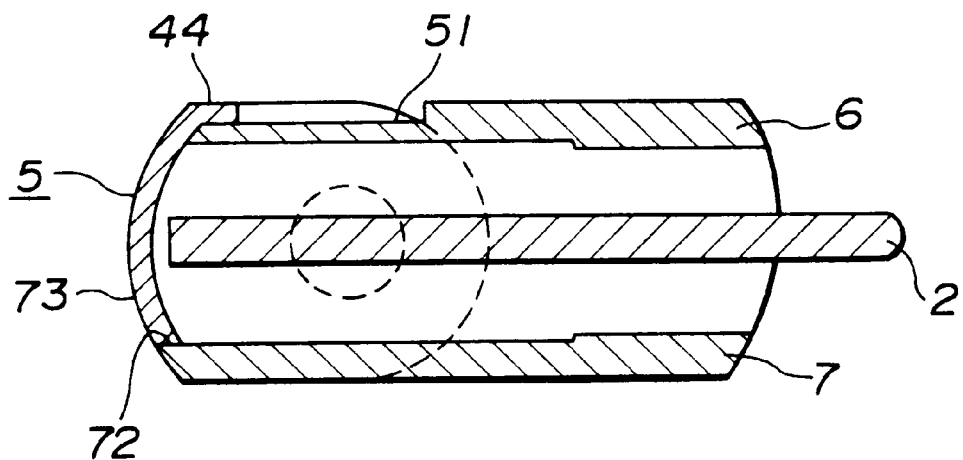
FIG. 26 is a vertical cross sectional view showing the upper half portion and the lower half portion having a contact portion arranged to be engaged to the lid having the main surface having a circular-arc-shape cross section.

To reduce the dead spaces h1 and k, the lid 5 may be formed such that a main surface 73 having a circular-arc-shape cross section and the plate-like upper plate portion 44 are integrally formed to have an L-shape cross section, as shown in FIG. 26. In this case, the mechanical strength of the lid 5 is improved and thus a structure capable of satisfactorily withstanding outer pressure can be formed. The lower half portion 7 may have a lid contact portion 72 with which the end surface of the main surface 73 of the lid 5 is brought into contact similarly to the structure shown in FIG. 24 when the recording/reproducing opening 4 has been closed.

Figure 27:
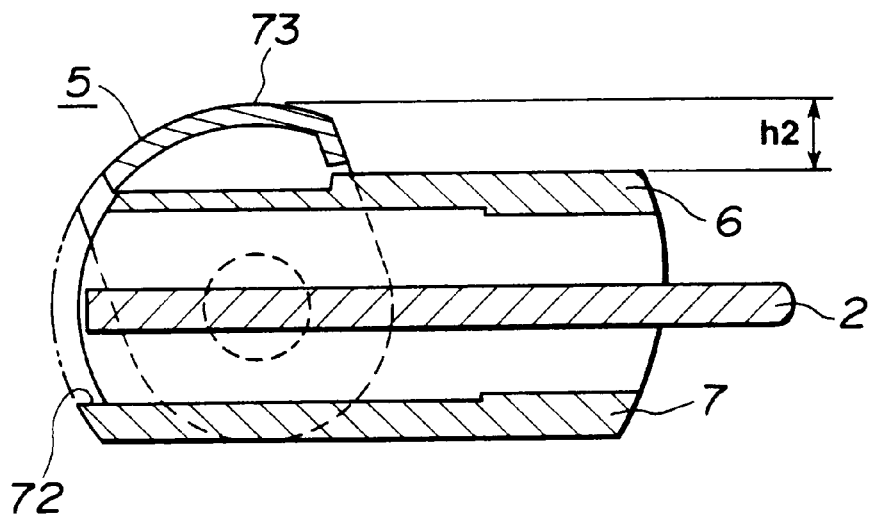
FIG. 27 is a cross sectional view showing the shapes of the upper half portion and the lower half portion having the contact portion arranged to be engaged to the lid having the circular-arc-shape cross section.

Also the disk cartridge including the lid 5 having the circular-arc-shape main surface 73 involves dead space h2, as shown in FIG. 27. Since the main surface 73 is formed into the circular-arc shape, the dead space h2 can be made to be smaller than the dead space h1 of the lid 5 having the plate-like main surface 41 as shown in FIG. 25.

The lid 5 including the main surface 73 having a circular-arc-shape cross section is able to prevent formation of a dead space projecting over outer surface of the main surface 73 when the recording/reproducing opening 4 has been closed.

Since the dead space can be reduced in the disk cartridge 1 including the lid 5 provided with the main surface 73 having the circular-arc-shape cross section, the size of a drive unit of a recording/reproducing apparatus on which the disk cartridge 1 is mounted can be reduced.

Figure 28:
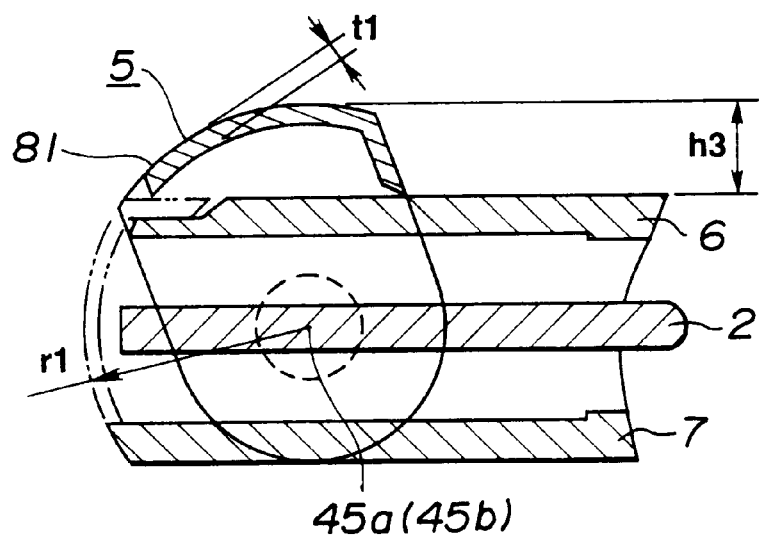
FIG. 28 is a vertical cross sectional view showing the shapes of the upper half portion and the lower half portion arranged to be engaged to a metal lid.

The lid 5 may be formed to have a main surface 81 made of a rigid metal material in such a manner that the cross sectional thickness of the main surface 81 is t1, as shown in FIG. 28. At this time, the outer surface of the main surface 81 having the circular-arc-shape cross section is rotated to draw a locus having radius r1 around the support shafts 45a and 45b. In the disk cartridge 1, dead space h3 is formed after the lid 5 has been retracted.

The lid 5 is made of thermal plastic resin, such as plastic exemplified by polyacetal (POM), polypropylene (PP), ABS (Acrylonitrile Butadiene Styrene Copolymer) resin and high-impact polystyrene (Hi-Polystyrene). If the foregoing plastic is employed, the lid having the complicated shape can easily be molded.

Figure 29:
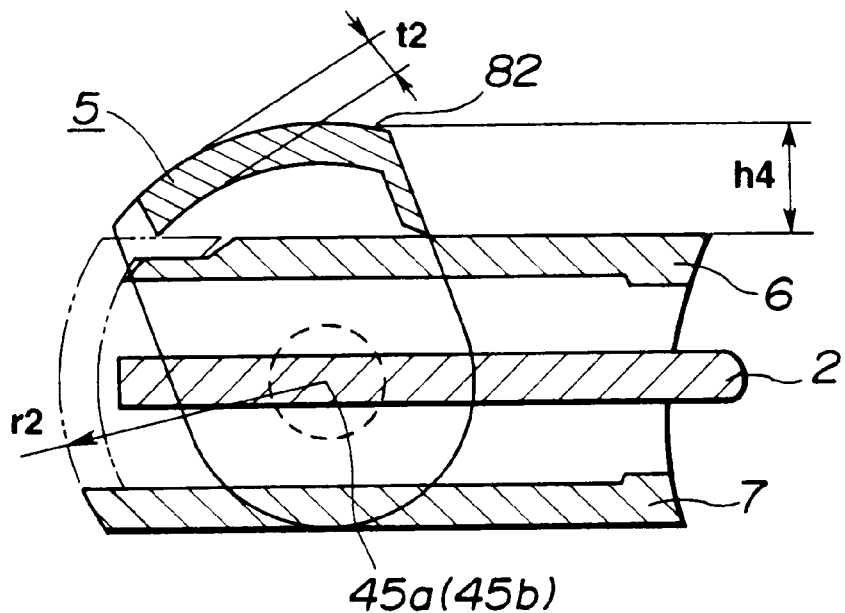
FIG. 29 is a vertical cross sectional view showing the shapes of the upper half portion and the lower half portion arranged to be engaged to a plastic lid.

If the lid 5 is made of the plastic to have mechanical strength similar to that of the lid 5 made of the metal material, the cross sectional thickness t2 of the main surface 82 of the lid 5 is larger than the cross sectional thickness t1, as shown in FIG. 29.

Therefore, the outer surface of the main surface 82 of the disk cartridge 1 having the plastic lid 5 draws a locus having radius r2 around the support shafts 45a and 45b, the radius r2 being larger than the radius r1. Moreover, dead space h4 when the lid 5 has been extracted is larger than the dead space h3.

Therefore, the lid 5 made of the rigid material is able to furthermore reduce the dead space because the thickness of the main surface 81 can be reduced. Thus, a disk cartridge 1 having the lid 5 made of the rigid material has excellent mechanical strength. Moreover, the size of the disk cartridge 1 can be reduced. In addition, the foregoing disk cartridge 1 enables the size of the drive unit of the recording/reproducing apparatus on which the disk cartridge 1 is mounted to be reduced.

Figure 30:
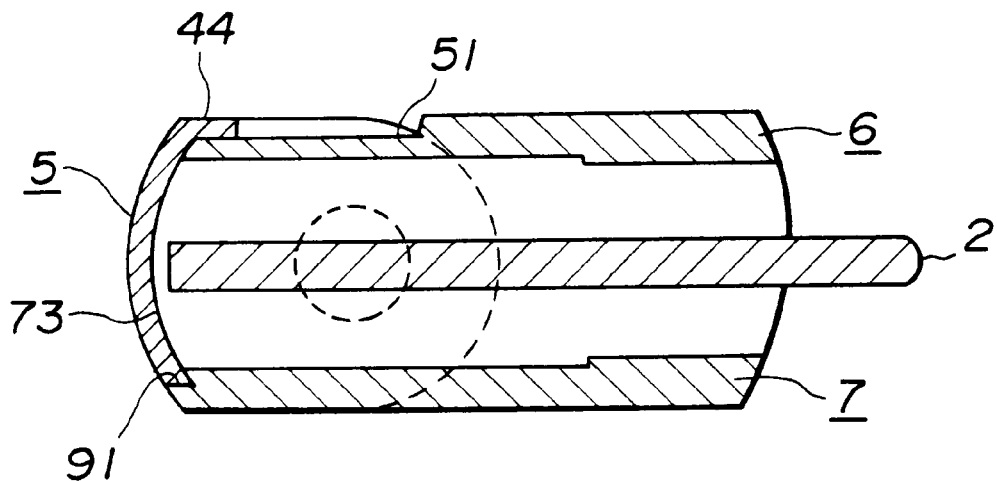
FIG. 30 is a vertical cross sectional view showing the upper half portion and a lower half portion having a stepped contact portion arranged to be engaged to the lid having the circular-arc-shape main surface.
Figure 31:
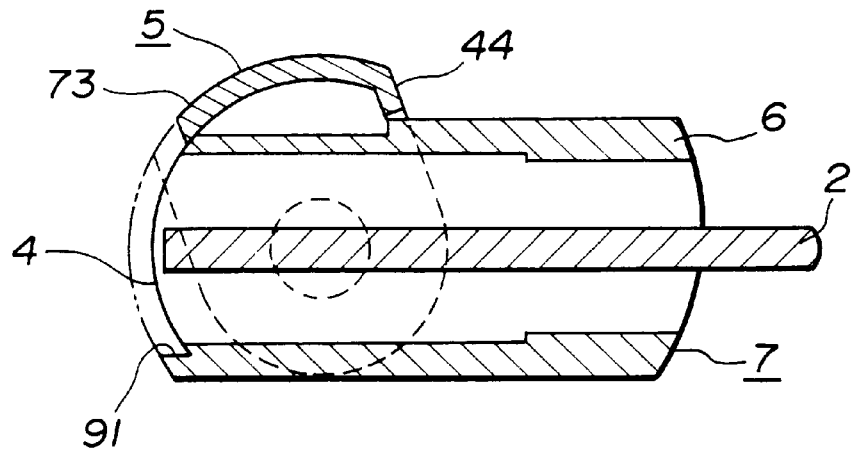
FIG. 31 is a vertical cross sectional view showing the upper half portion and a lower half portion having a stepped contact portion arranged to be engaged to the lid having the circular-arc-shape main surface.

As shown in FIGS. 30 and 31, the lower half portion 7 may have a lid step contact portion 91 projecting over the end surface of the upper half portion 6 and formed into a stepped shape.

In this case, the lid 5 is formed by integrally molding the upper plate portion 44 formed to be engaged to an outer stepped portion 51 of the upper half portion 6 and the main surface 73 having an end which is brought into contact with the lid step contact portion 91 when the recording/reproducing opening 4 has been closed.

As compared with the structure shown in FIG. 24 or 26 in which the lid contact portion 71 or the lid contact portion 72 is provided, introduction of dust or the like into the cartridge body 3 can furthermore satisfactorily be prevented in a state where the recording/reproducing opening 4 has been closed by the lid 5.

Figure 32:
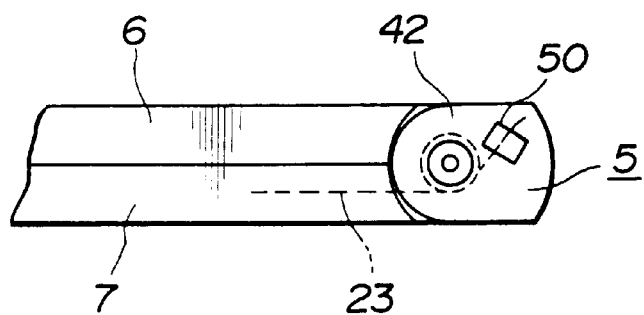
FIG. 32 is a side view showing a state of a torsion spring for urging a lid having a circular-arc-shape main surface provided for the disk cartridge.
Figure 33:
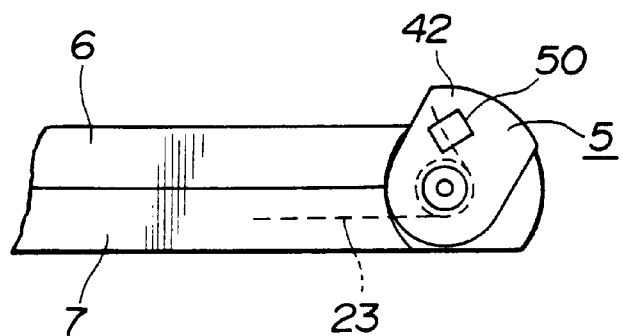
FIG. 33 is a side view showing another state of the torsion spring for urging the lid provided for the disk cartridge and having the main surface having a circular-arc-shape main surface.

As shown in FIGS. 32 and 33, the torsion spring 23 is disposed adjacent to the first support portion 42 of the lid 5 including the main surface having a circular-arc-shape cross section shown in FIGS. 26 to 31. In addition, the spring stopping hole 50 is formed in the first support portion 42. An end of the torsion spring 23 is inserted into the spring stopping hole 50 so as to be attached. When spring force in the clockwise rotation acts on the lid 5 as shown in FIGS. 32 and 33, the lid 5 is able to close the recording/reproducing opening 4 thanks to the spring force of the torsion spring 23.

In the disk cartridge according to the present invention, the magnetic disk which is accommodated in the cartridge body may be changed.

Moreover, the disk cartridge according to the present invention is not limited to accommodate the magnetic disk in the cartridge body thereof. For example, another disc-shape recording medium, such as a magneto-optical recording medium may be employed.

The support portion for rotatively supporting the lid is not limited to that provided for the upper half portion. The support portion may be provided for the lower half portion.

Since the disk cartridge according to the present invention includes a cartridge body arranged to accommodate a disc recording medium and having a recording/reproducing opening 4 and a support shaft for rotatively supporting the lid, the recording/reproducing opening is opened/closed by the lid which is rotatively supported by the support shaft. Therefore, generation of dust and introduction of dust into the cartridge body can be prevented. As a result, deterioration of an information signal which is recorded or reproduced can be prevented.

Moreover, the disk cartridge according to the present invention is able to protect a signal recording/reproducing device for writing/reading an information to and from a disc-shape recording medium which is accommodated in the disk cartridge from being damaged.

The disk cartridge according to the present invention is able to serve as an information recording medium having an information signal which does not deteriorate even if it is shocked from outside.

Since the size of the disk cartridge according to the present invention can be reduced, the size of a recording/reproducing apparatus on which the disk cartridge is mounted can be reduced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A disk cartridge comprising:

a disk cartridge body for rotatively accommodating a disc-shaped recording medium and having a recording/reproducing opening on a side surface thereof to permit insertion of means for recording/reproducing an information signal, said cartridge body including an upper half portion and a lower half portion joined together with said upper half portion having an upper step section stepped downwardly from an exterior surface thereof;

a lid movable between a closed position, wherein said recording/reproducing opening of said cartridge body is closed, and an open position, wherein said recording/reproducing opening is opened, said lid having a main surface for closing said recording/reproducing opening when said lid is moved to its closed position, said main surface having a pair of end portions having support portions formed thereon, said lid further having an upper plate portion integrally formed with said main surface generally an L-shape such that in the closed position of the lid, the upper plate portion rests on said upper step section of said upper half portion of said cartridge body so that an outer surface of said upper plate portion and said exterior surface of said upper half portion lie in a substantially contiguous plane; and a support shaft for rotatively supporting said support portion of said lid for moving said lid between its closed and open positions.

2. A disk cartridge according to claim 1 wherein said lid has a cross section which is a generally circular-arc shape.

3. A disk cartridge according to claim 1, wherein said upper plate portion is formed along an end of said lid which is in parallel relation to the lengthwise direction of said main surface such that said upper plate portion is in parallel relation to a side surface of said cartridge body having said recording/reproducing opening formed therein.

4. A disk cartridge according to claim 1, wherein said upper plate portion and said lower plate portion are formed along respective top and bottom portions of said main surface which are in parallel relation to the lengthwise direction of said main surface such that said upper and lower plate portions are formed opposite to each other and in parallel relation to a side surface of said cartridge body having said recording/reproducing opening formed therein.

5. A disk cartridge according to claim 3, wherein at least either of said support portions has a length longer than a length of the shorter side of said upper plate portion.

6. A disk cartridge according to claim 1, wherein said recording/reproducing opening of said cartridge body has a length not smaller than ⅔ of the width of said cartridge body.

7. A disk cartridge according to claim 1, wherein each of said support portions has a support hole through which said support shaft is inserted, and an engaging portion projecting by a length larger than the thickness of said support portion which is formed in the circumferential portion of said support hole.

8. A disk cartridge according to claim 1, wherein said lid has an biasing member for urging said recording/reproducing opening into a direction in which said recording/reproducing opening is closed and a receiving hole to which an end of said biasing member is attached.

9. A disk cartridge according to claim 1, wherein said lid is made of a metal material.

10. A disk cartridge according to claim 1, wherein said support shaft is integrally formed with said cartridge body.

11. A disk cartridge according to claim 1, wherein said lower half portion has, at a front end at which said lid is disposed, a contact portion projecting over said upper half portion; and an end of said lid comes in contact with said contact portion of said lower half when said recording/reproducing opening has been closed.

12. A disk cartridge according to claim 1, wherein said cartridge body has an engaging groove arranged to be engaged to an engaging portion of said support hole of said lid.

13. A disk cartridge according to claim 1, wherein said cartridge body has a contact portion at a front end at which said lid is dispossed, and an end of said lid comes in contact with said contact portion when said recording/reproducing opening has been closed.

* * * * *